United States Patent
Arai et al.

(12) 
(10) Patent No.: US 6,427,817 B1
(45) Date of Patent: Aug. 6, 2002

(54) LUBRICATION STRUCTURE OF ELECTROMAGNETIC CLUTCH

(75) Inventors: Kentaro Arai; Ryuichi Murakami; Yasunori Arai; Tetsuro Hamada, all of Saitama (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/677,876

(22) Filed: Oct. 3, 2000

(51) Int. Cl.$^7$ .................. F16D 13/74; F16D 27/115
(52) U.S. Cl. ............. 192/35; 192/70.12; 192/84.7; 192/113.34
(58) Field of Search ............. 192/35, 70.12, 192/84.7, 113.3, 113.34

(56) References Cited

U.S. PATENT DOCUMENTS

| | | | |
|---|---|---|---|
| 4,471,862 A | * | 9/1984 | Sugita .................. 192/84.961 |
| 5,699,888 A | * | 12/1997 | Showalter .................. 192/35 |
| 5,911,391 A | * | 6/1999 | Suetake et al. .................. 192/35 |
| 6,250,445 B1 | * | 6/2001 | Davis .................. 192/35 |

FOREIGN PATENT DOCUMENTS

JP          1-145434 A    *  6/1989   ............ 192/84.691

* cited by examiner

Primary Examiner—Richard M. Lorence
(74) Attorney, Agent, or Firm—Armstrong, Westerman & Hattori, LLP

(57) ABSTRACT

An electromagnetic clutch having a solenoid coil (80), a coil housing (81) disposed surrounding the solenoid coil (80), an armature plate (82) disposed facing the side of the coil housing, and a clutch mechanism. The current flowing to the solenoid coil (80) is controlled so as to control the clamping of the armature plate (82) to the coil housing (81), and the clamping force acting on the armature plate is used to control the engagement of the clutch mechanism. There is also a lubricating oil supply channel (63) for supplying lubricating oil from the inside in the radial direction into a gap between the coil housing and the armature plate, and oil reservoir holding lubricating oil to be supplied into the gap is formed around the inner periphery of the portion where the coil housing faces the armature plate.

9 Claims, 7 Drawing Sheets

LUBRICATION STRUCTURE OF ELECTROMAGNETIC CLUTCH

FIELD OF THE INVENTION

The present invention relates to an electromagnetic clutch having a solenoid coil, a coil housing disposed surrounding the solenoid coil, an armature plate disposed facing the side of the coil housing, and a clutch mechanism, and more particularly relates to a lubricating structure for supplying lubricating oil to the area where the coil housing faces the armature plate (facing gap)

BACKGROUND OF THE INVENTION

Various electromagnetic clutches of this type were known in the past, and have been disclosed in Japanese Laid-Open Patent Applications H10-194004 and 2000-240685 and elsewhere. The electromagnetic clutches disclosed in these publications are used as differential mechanisms in automobile axles. For instance, in Japanese Laid-Open Patent Application H10-194004, differential clutch mechanisms each composed of an electromagnetic clutch are installed on the left and right of a final reduction mechanism consisting of hypoid gears in a rear axle device, and a differential action is achieved and drive is switched between two- and four-wheel-drive modes by engaging and disengaging these left and right differential clutch mechanisms.

This differential clutch mechanism comprises a wet-type multi-plate clutch mechanism, a solenoid mechanism, and a ball cam mechanism. The solenoid mechanism comprises an armature plate facing a coil housing provided around a solenoid coil, the armature plate is linked to the input side of the clutch mechanism, and the coil housing is linked to one end of the ball cam mechanism. The other end of the ball cam mechanism is linked to the output side of the clutch mechanism and provides a thrust force for engaging the clutch mechanism.

With this differential clutch mechanism, current is sent to the solenoid coil to generate a magnetic force which clamps the armature plate to the coil housing, and this causes the coil housing to rotate along with the armature plate, so that one end of the ball cam mechanism rotates along with the input side of the clutch mechanism. Because the other (second) end of the ball cam mechanism here is linked to the output side of the clutch mechanism, if there is a rotational difference between the input and output of the clutch mechanism (such as when the rear wheel rotation is different with respect to the rotation on the axle drive side), the second end will be rotationally driven with respect to the first end of the ball cam mechanism, a thrust force in the engagement direction will be imparted from the second end to the clutch mechanism, and the differential clutch mechanism will be engaged.

A problem with a conventional differential clutch mechanism, however, was that when the clamping of the armature plate to the coil housing was controlled by means of the magnetic force of the solenoid, noise resulted when the two metal components came into sliding contact, and on/off control was virtually the only control that was possible. Consequently, the engagement of the differential clutch mechanisms could only be controlled in an on/off fashion, and controlling partial engagement was exceedingly difficult.

SUMMARY OF THE INVENTION

It is an object of the present invention to allow control so that not only complete engagement of the coil housing and armature plate is possible in an electromagnetic clutch, but also partial engagement in which the two components are in sliding contact.

In the present invention, an electromagnetic clutch has a solenoid coil, a coil housing disposed surrounding the solenoid coil, an armature plate disposed facing the side of the coil housing, and a clutch mechanism (in an embodiment, for example, a mechanism comprising a clutch housing 52, separator plates 53, clutch plates 54, a pressure plate 55, and so forth), the current flowing to the solenoid coil is controlled so as to control the clamping of the armature plate to the coil housing, and the clamping force acting on the armature plate is used to control the engagement of the clutch mechanism. Furthermore, there is provided a lubricating oil supply channel for supplying lubricating oil from the inside in the radial direction into a gap between the coil housing and the armature plate (such as a first lubricating hole 61 and a third lubricating hole 63 in the embodiments), and an oil reservoir holding lubricating oil to be supplied into the gap is formed around the inner periphery of the portion where the coil housing faces the armature plate.

With an electromagnetic clutch lubricating structure such as this, the lubricating oil held in the oil reservoir is adequately and effectively supplied into the gap where the coil housing faces the armature plate, which affords control over the two components such that they are in smooth sliding contact without making any noise. Accordingly, the clutch mechanism not only can be controlled in on/off fashion, but can also easily be controlled for partial engagement.

It is preferable in the above structure if an oil fence ring is mounted around the inner peripheral surface of the armature plate, and the lubricating oil supplied from the lubricating oil supply channel is held back by this oil fence ring, forming the oil reservoir. In this case, it is preferable if an annular rubber lip is provided at the inner peripheral end of the oil fence ring.

It is also preferable in the above structure if at least part of the inner peripheral end of the armature plate projects annularly toward the inside, forming an annular projection, and the lubricating oil supplied from the lubricating oil supply channel is held back by this annular projection, forming the oil reservoir.

Further, in the present invention, an electromagnetic clutch has a solenoid coil, a coil housing disposed surrounding the solenoid coil, an armature plate disposed facing the side of the coil housing, and a clutch mechanism, and there is provided a cam mechanism (such as a ball cam mechanism 65 in the embodiments) that controls the current flowing to the solenoid coil so as to control the clamping of the armature plate to the coil housing, and converts the clamping force acting on the armature plate into the engagement force of the clutch mechanism, thereby constituting a power transmission apparatus. In this case, the clamping force acting on the armature plate is used via the cam mechanism to control the engagement of the clutch mechanism, there is provided a lubricating oil supply channel for supplying lubricating oil from the inside in the radial direction into a gap between the coil housing and the armature plate, and an oil reservoir holding lubricating oil to be supplied into the gap is formed around the inner periphery of the portion where the coil housing faces the armature plate.

Again with an electromagnetic clutch lubricating structure such as this, the lubricating oil held in the oil reservoir is adequately and effectively supplied into the gap where the coil housing faces the armature plate, which affords control over the two components such that they are in smooth sliding contact without making any noise. Accordingly, the clutch mechanism not only can be controlled in on/off fashion, but can also easily be controlled for partial engagement.

It is preferable in the above structure if the lubricating oil supply channel is formed through the cam mechanism, so that the cam mechanism will also be thoroughly lubricated.

It is preferable in the above structure if an oil fence ring is mounted around the inner peripheral surface of the armature plate, and the lubricating oil supplied from the lubricating oil supply channel is held back by this oil fence ring, forming the oil reservoir. In this case, it is preferable if an annular rubber lip is provided at the inner peripheral end of the oil fence ring.

Also, at least part of the inner peripheral end of the armature plate may project annularly toward the inside, forming an annular projection, and the lubricating oil supplied from the lubricating oil supply channel may be held back by this annular projection, forming the oil reservoir.

The above-mentioned cam mechanism can comprise a first cam plate linked to the coil housing, a second cam plate that is linked to the output-side member of the clutch mechanism and imparts an engagement thrust force to the clutch, and cam balls that are disposed in cam grooves formed in the first and second cam plates and are sandwiched between the first and second cam plates. In this case, it is preferable if the lubricating oil supplied from the lubricating oil supply channel is held back by an oil seal mounted on the inner peripheral surface of the coil housing and having a lip facing the side of the first cam plate, forming the oil reservoir.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention and wherein.

DESCRIPTION OF THE PREFERRED EMBODIMENTS

Figure 1:
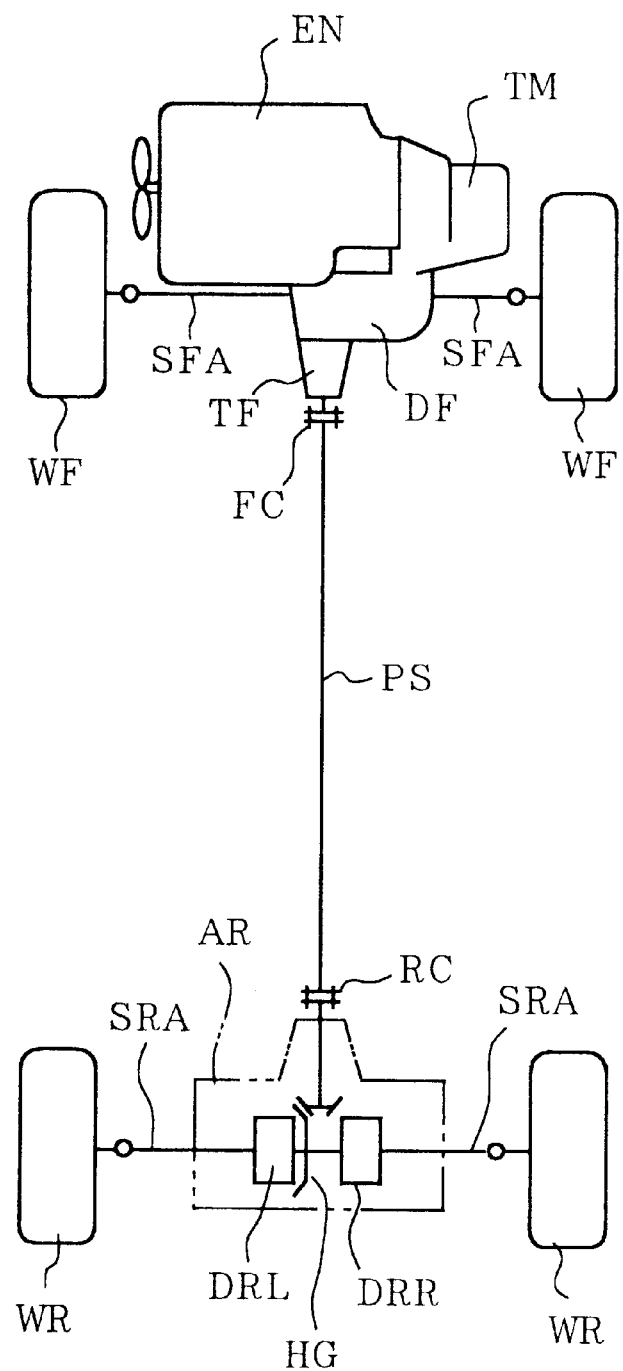
FIG. 1 is a schematic diagram illustrating a power transmission system in a four-wheel-drive vehicle, equipped with the electromagnetic clutch pertaining to the present invention.
Figure 2:
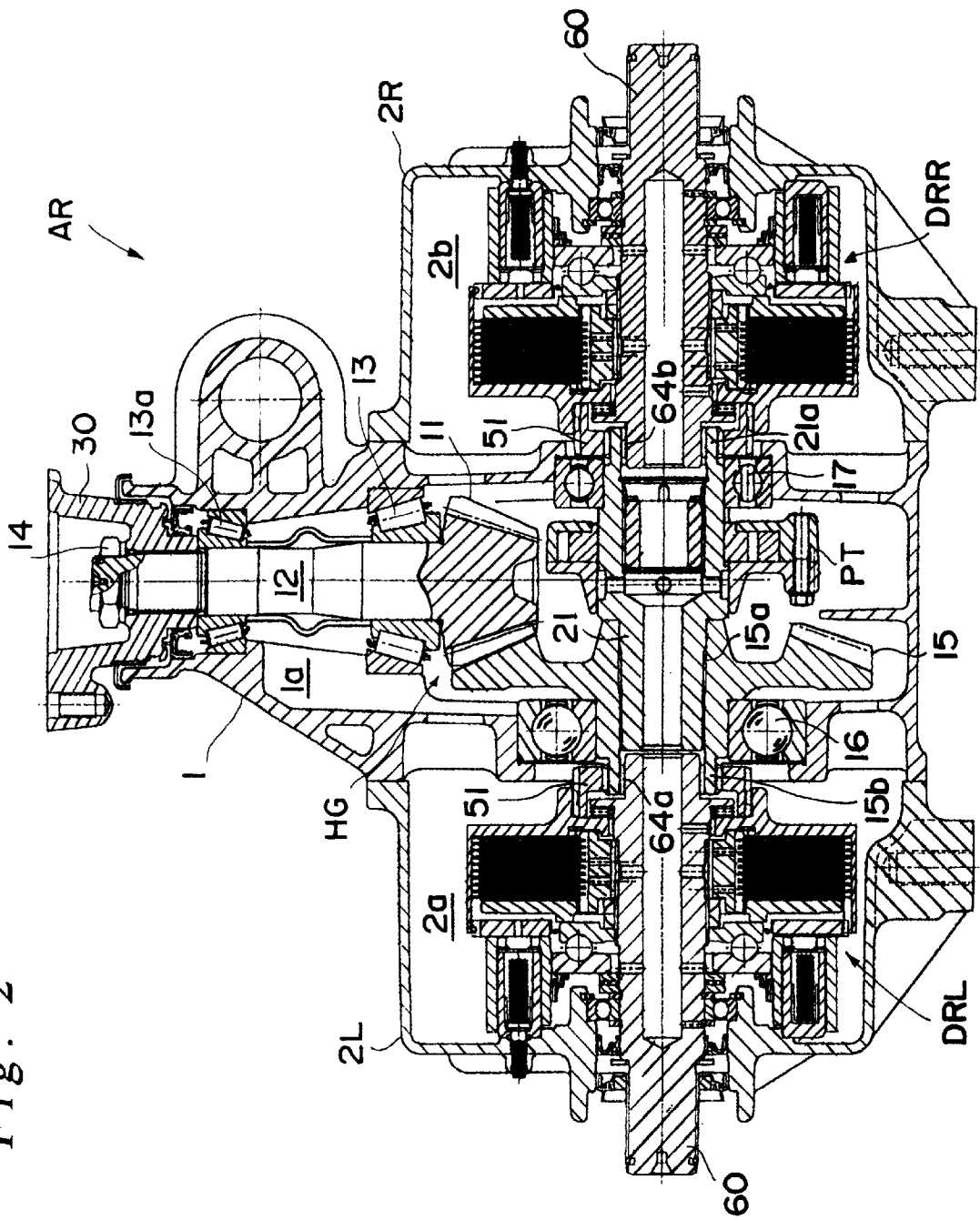
FIG. 2 is a cross section illustrating the structure of the rear axle device in the above-mentioned power transmission system.
Figure 3:
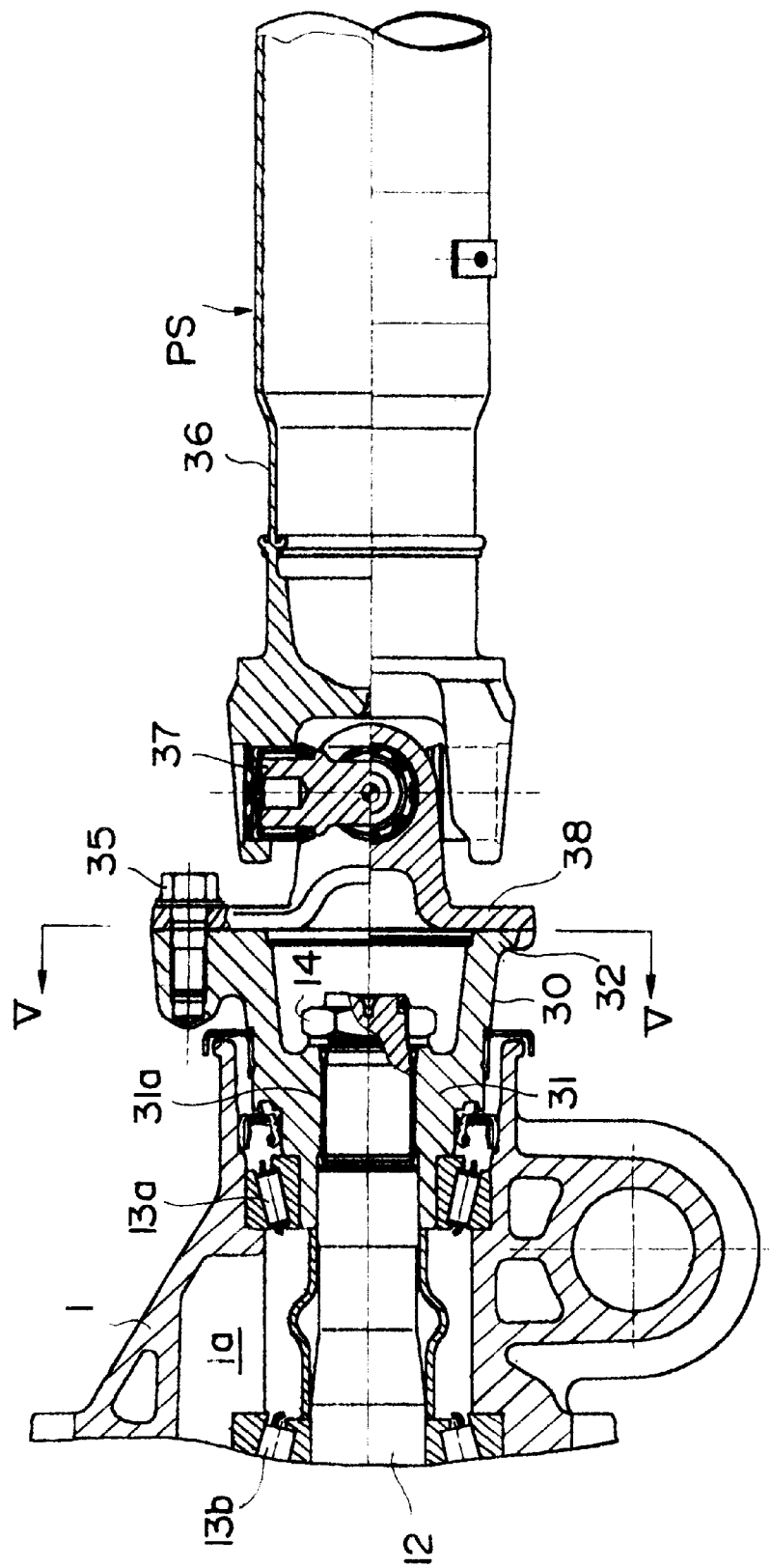
FIG. 3 is a partial cross section illustrating the linked portion of the above-mentioned rear axle device and a propeller shaft.

Preferred embodiments of the present invention will now be described through reference to the figures. The first description will be of a case in which the electromagnetic clutch pertaining to the present invention is used as a differential clutch mechanism for creating a differential action in an axle. FIG. 1 illustrates a power transmission system having an axle equipped with this differential clutch mechanism.

This vehicle is a four-wheel-drive vehicle, in which an engine EN is installed transversely at the front of the chassis and a transmission TM is integrally coupled to the output end of the engine EN. A front differential mechanism DF and a transfer mechanism TF are provided inside this transmission TM. The power of the engine EN, whose speed is varied by the transmission TM, is split by the front differential mechanism DF and transmitted to left and right front axle shafts SFA so as to drive the left and right front wheels WF. The above-mentioned engine power is also split by the transfer mechanism TF and transmitted from a front coupling FC to a propeller shaft PS. This propeller shaft PS is linked to a rear axle device AR via a rear coupling RC.

The rear axle device AR has a hypoid gear mechanism HG (final reduction mechanism) that converts the rotational direction such that the rotation of the propeller shaft PS can be transmitted to rear axle device shafts SRA perpendicular to this rotation, and reduces the speed of this rotation, and a pair of left and right differential clutch mechanisms DRL and DRR that are located to the left and right of the hypoid gear mechanism HG and control the transmission of the rotational power of the hypoid gear mechanism HG to the rear axle shafts SRA. In the rear axle AR, the engine power transmitted through the propeller shaft PS is converted in its rotational direction via the hypoid gear mechanism HG and is reduced in speed, then split and transmitted to the left and right rear axle shafts SRA with the transmission controlled by the left and right differential clutch mechanisms DRL and DRR, allowing the left and right rear wheels WR to be driven.

These rear differential clutch mechanisms DRL and DRR have electromagnetic clutches, whose engagement is controlled according to the rotational speed of the wheels, the gear ratios of the vehicle, and so forth. Accordingly, if the left and right rear differential clutch mechanisms DRL and DRR are both released, the engine power is not transmitted to the rear wheels WR, and only the front wheels WF are driven, resulting in a two-wheel-drive state. On the other hand, if the left and right rear differential clutch mechanisms DRL and DRR are engaged, the engine power is transmitted to the front wheels WF and to the rear wheels WR, resulting in a four-wheel-drive state. In this four-wheel-drive state, the rear differential clutch mechanisms DRL and DRR are engaged whenever there is a difference between the drive-side rotation and the wheel rotation, as will be discussed below. Suitably controlling the engagement of the left and right rear differential clutch mechanisms DRL and DRR affords the suitable control of the ratio in which the power is split to the left and right rear wheels WR, providing what is known as a differential function.

The above-mentioned rear axle device AR will be described through reference to FIGS. 2 to 6. The pair of left and right rear differential clutch mechanisms DRL and DRR are installed inside the rear axle device AR as mentioned above, but since these have a structure that is symmetrical to the left and right, the left and right symmetrical portions will be labeled the same and redundant descriptions will be omitted.

The rear axle device AR has a center housing 1 and left and right side housings 2L and 2R coupled to the left and right ends of the center housing 1. The hypoid gear mechanism HG is disposed inside a center space 1A formed inside the center housing 1, the left rear differential clutch mechanism DRL is disposed inside a left side space 2a formed inside the left side housing 2L, and the right differential clutch mechanism DRR is disposed in a right side space 2b formed inside the right side housing 2R.

The hypoid gear mechanism HG disposed inside the center housing 1 comprises a drive pinion 11 and a driven gear 15 whose rotational axes are perpendicular and which mesh with each other. The drive pinion 11 is able to rotate around a rotational axis extending in the longitudinal direction of the chassis, and has a pinion shaft 12 that extends in the longitudinal direction of the chassis and is supported rotatably with respect to the center housing 1 by tapered roller bearings 13a and 13b. The distal end of the pinion shaft 12 protrudes out from the center housing 1.

Figure 5:
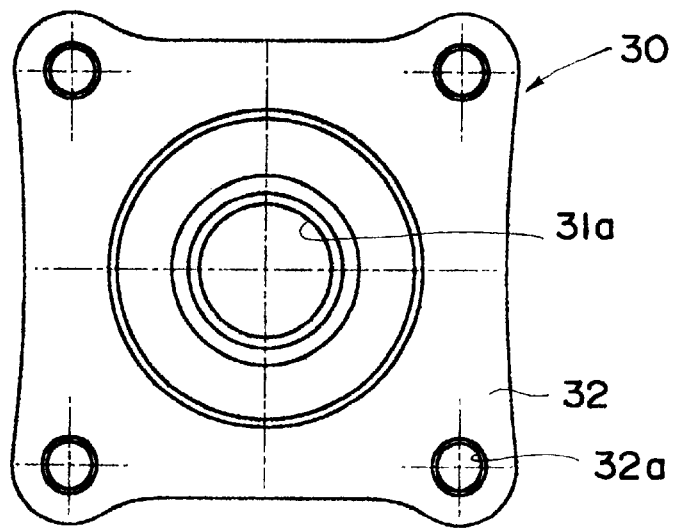
FIG. 5 illustrates the end face shape of the companion flange used in the rear axle device.

A companion flange 30 is fastened by a retainer nut 14 and splined to this portion of the pinion shaft 12 that protrudes outward. The companion flange 30 is linked to the pinion shaft 12 by a spline 31a formed on a boss 31, and has at its outer end an end face flange 32 shaped as shown in FIG. 5. Threaded holes 32a for attaching fastener bolts are formed in the end face flange 32. Meanwhile, the propeller shaft PS has a yoke flange 38 attached via a universal joint 37 to the rear end of a drive tube 36 extending in the longitudinal direction of the chassis and rotatably supported, and this yoke flange 38 and the companion flange 30 are coupled by fastener bolts 35. The yoke flange 38 and the companion flange 30 constitute the rear coupling RC. The rotation of the propeller shaft PS is transmitted to the drive pinion 11 and rotationally drives the hypoid gear mechanism HG.

The driven gear 15 of the hypoid gear mechanism HG is rotatable around the rotational axis extending in the lateral direction of the chassis (the rotational axis perpendicular to the rotational axis of the drive pinion 11) and is supported by the center housing 1 via a ball bearing 16. An internal spline 15a is formed around the rotational axis in the driven gear 15, and a center shaft 21 that meshes with this internal spline 15a at the left end is disposed inside the center housing 1 along the same axis as the driven gear 15. The right end of the center shaft 21 is rotatably supported by the center housing 1 via a ball bearing 17, and the center shaft 21 rotates integrally with the driven gear 15.

The left end 15b of the driven gear 15 is splined to a left linking ring 51 around the outer periphery, and the driven gear 15 is linked to the left rear differential clutch mechanism DRL via this left linking ring 51. The right end 21a of the center shaft 21 is splined to the left linking ring 51 around the outer periphery, and the center shaft 21 is linked to the left rear differential clutch mechanism DRL via this left linking ring 51. Here, the center shaft 21 is splined to the driven gear 15, and the driven gear 15 (that is, the hypoid gear mechanism HG) is linked to the left and right differential clutch mechanisms DRL and DRR.

These left and right differential clutch mechanisms DRL and DRR will be described through reference to FIG. 4, which illustrates the left differential clutch mechanism DRL. As mentioned above, the left differential clutch mechanism DRL is in left and right symmetry with the right differential clutch mechanism DRR, and since the structure and operation thereof are identical, only the left differential clutch mechanism DRL will be described, and description of the right differential clutch mechanism DRR will be omitted.

The left differential clutch mechanism DRL has the cylindrical clutch housing 52 and a plurality of separator plates 53 and a plurality of clutch plates 54 disposed inside this clutch housing 52. The clutch housing 52 is splined to the outer periphery 51b of a linking ring 51 at a right end hub 52a. The separator plates 53 consist of metal disk-shaped members that are engaged with the inner surface of the clutch housing 52 around the outer periphery, and rotate integrally with the clutch housing 52. The clutch plates 54 comprise a clutch facing material bonded to both sides of metal disk-shaped members, and are disposed between the various separator plates 53. Specifically, the separator plates 53 and the clutch plates 54 are arranged alternating in the axial direction. A disk-shaped pressure plate 55 is provided so as to cover from the outside these plates 53 and 54 that are disposed inside the clutch housing 52 in these alternating positions.

A clutch hub 56 is provided on the inner peripheral side of the separator plates 53, clutch plates 54, and pressure plate 55 disposed inside the clutch housing 52. The inner periphery of the clutch plates 54 engages with the outer periphery of the clutch hub 56, so that the clutch plates 54 and the clutch hub 56 rotate integrally. This clutch hub 56 is disposed over a left side shaft 60, splined at the inner periphery. The clutch housing 52 is rotatably attached over the left side shaft 60 by a radial bearing 64b and a thrust bearing 74.

The left side shaft 60 has its right end 60a inserted into a support hole formed in the right end of the driven gear 15, so that the left side shaft 60 is rotatably supported by a radial bearing 64a, and on its left side is rotatably supported by the left side housing 2L via a ball bearing 70. In the case of the left side shaft 60, the right end is inserted into a support groove formed in the left end of the center shaft 21 and is rotatably supported by a radial bearing 64a. This left shaft 60 is connected to the left rear wheel WR and constitutes the left rear axle shaft SRA.

The inner side surface of the pressure plate 55 protrudes to the left and forms a pressing component 55a, and a ball cam mechanism 65 is disposed so as to abut against this pressing component 55a. The ball cam mechanism 65 comprises a first cam plate 66 disposed rotatably over the left side shaft 60, a second cam plate 68 disposed splined to the left side shaft 60, and a plurality of cam balls 67 disposed in a plurality of cam grooves 66a and 68a formed in the cam plates 66 and 68 (see FIGS. 6A and 6B).

The first cam plate 66 is axially positioned with respect to the left side shaft 60 by a retaining ring 72 and a thrust bearing 72. Accordingly, as discussed below, the thrust force generated by the ball cam mechanism 65 is received by the first cam plate 66, acts on the second cam plate 68 via the cam balls 67, moves the second cam plate 68 to the right, and presses the pressing component 55a of the pressure plate 55 to the right.

A doughnut-shaped coil housing 81 having a rectangular cross section open at the left end is disposed on the outer peripheral side of the first cam plate 66. This coil housing 81 is in the form of a doughnut centered around the rotational center of the left side shaft 60, is splined at its inner periphery to the outer periphery of the first cam plate 66, and is able to rotate over the left side shaft 60 integrally with the first cam plate 66.

A solenoid coil 80 is provided protruding into a space with a rectangular cross section and open at the left end in the coil housing 81. This solenoid coil 80 is formed in a doughnut shape covered by a solenoid cover 80a, and is fixed to the left side housing 2L. There is gap between the outer surface of the solenoid cover 80a and the inner surface of the rectangular-cross-section space of the coil housing 81, and the coil housing 81 is freely rotatably with respect to the fixed solenoid coil 80.

A disk-shaped armature plate 82 is provided facing a sliding surface 81 a that forms the right end surface of the coil housing 81. The armature plate 82 engages with the clutch housing 52 around its outer periphery, and rotates integrally with the clutch housing 52.

An oil seal 75 is attached to the inner peripheral surface 81b of the coil housing 81, and the lip thereof slides over the left side of the first cam plate 66. An oil fence ring 76 is attached to the inner peripheral surface of the armature plate 82. As a result, an oil reservoir 77 is formed by being sandwiched between the oil seal 75 and the oil fence 76 on the inner peripheral side of the inner peripheral surface of the armature plate 82 and the inner peripheral surface of the coil housing 81. This oil reservoir 77 communicates with the gap between the sliding surface 81a of the coil housing and the sliding surface 82a forming the left end surface of the armature plate 82.

The oil fence ring 76 comprises a rubber lip attached to the inner peripheral end of an annular metal core. Therefore, the inner peripheral end of the oil fence ring 76 is close to the outer peripheral surface of the second cam plate 68, but even if the two should come into contact during rotation, the contact is between rubber and metal, thereby avoiding the problems of scratching and noise generated by contact. This oil fence ring 76 is attached by press fitting to the inner peripheral surface of the armature plate 82, and this press fitting affords easier attachment than welding or bolting. Also, in the case of press fitting, there is no disturbance of the magnetic flux passing through the armature plate 82, so there is less likelihood of encountering the problem of the coil housing decreasing the magnetic clamping force of the armature plate.

A first lubricating hole 61 extending in the axial direction from the right end surface is formed inside the left side shaft 60, and second and third lubricating holes 62 and 63 are formed extending radially from this first lubricating hole 61. Lubricating oil is supplied to the first lubricating hole 61 from a trochoid pump PT attached over the center shaft 21. This lubricating oil is supplied from the second lubricating hole 62, through a lubricating hole 56a formed in the clutch hub 56, to the space between the separator plates 53 and the clutch plates 54, and is supplied from the third lubricating hole 63, through the ball cam mechanism 65 (through the space between the first cam plate 66 and the second cam plate 68), to the oil reservoir 77. Therefore, the ball cam mechanism 65 is also thoroughly lubricated.

The lubricating oil in the oil reservoir 77 is effectively supplied to the gap between the sliding surface 81a of the coil housing 81 and the sliding surface 82a of the armature plate 82. Accordingly, smooth sliding contact is achieved, without any noise being generated, when the sliding surface 81a of the coil housing 81 is in sliding contact with the sliding surface 82a of the armature plate 82.

Figure 4:
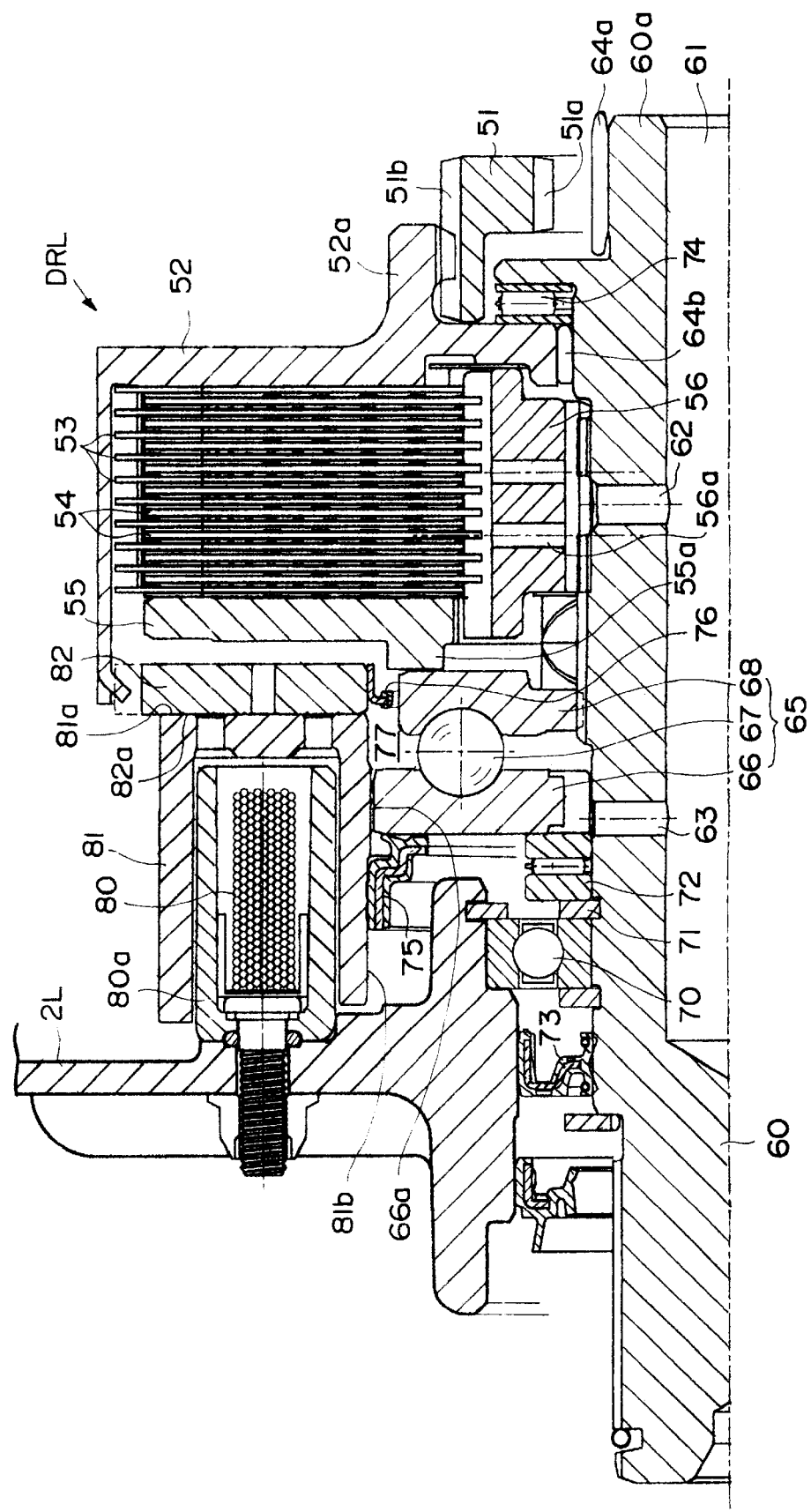
FIG. 4 is a cross section illustrating the left differential clutch mechanism in the above-mentioned rear axle device.

The location of the third lubricating hole 63 is not restricted to the location discussed above, and may be changed to the left side from the location shown in FIG. 4, for instance, so that [the lubricating oil] is supplied to the outer peripheral side via the thrust bearing 72. In this case, however, the location of the oil seal 75 must be moved to the left side so that the lubricating oil that has come through the thrust bearing 72 will be guided to the oil reservoir 77. The third lubricating hole 63 may be moved to the right side from the location in FIG. 4, so that the lubricating oil is supplied to the right side of the second cam plate 68. In this case, however, the location and shape of the oil fence ring 76 must be set so that the lubricating oil supplied in this way will be guided to the oil reservoir 77.

The operation of the left differential clutch mechanism DRL structured as above will now be described.

As mentioned above, when [the engine power] is transmitted from the propeller shaft PS to the hypoid gear mechanism HG so as to rotationally drive the driven gear 15, the rotational power is transmitted through the linking ring 51 to the clutch housing 52 so as to rotationally drive the clutch housing 52. Here, when the thrust force is not acting upon the pressure plate 55 via the ball cam mechanism 65, that is, when the pressure plate 55 is in a free state, the separator plates 53 merely rotate integrally with the clutch housing 52, and the clutch plates 54 rotate integrally with the clutch hub 56, with no power transmitted between the plates 53 and 54. Accordingly, no drive force is transmitted to the rear wheels WR, and the vehicle will be in a two-wheel-drive state.

Meanwhile, when the thrust force presses the pressure plate 55 to the right from the ball cam mechanism 65, the pressure plate 55 presses the separator plates 53 and clutch plates 54 against the clutch housing 52, and the plates 53 and 54 are engaged by their frictional force. This causes the clutch housing 52 and the clutch hub 56 to rotate integrally, resulting in a four-wheel-drive state in which the drive force is transmitted to the rear wheels WR.

Controlling the thrust force in this way so that it is applied to the pressure plate 55 through the ball cam mechanism 65 is accomplished by controlling the current sent to the solenoid coil 80. When the power to the solenoid coil 80 is switched on, a magnetic force is generated in the coil housing 81 surrounding this coil, and the armature plate 82 is clamped to the coil housing 81. As a result, the sliding surface 81a of the coil housing 81 slides with the sliding surface 82a of the armature plate 82, and a rotational force F acts upon the coil housing 81 such that the coil housing 81 is made to rotate the same as the armature plate 82, which rotates integrally with the clutch housing 52.

Here, the coil housing 81 is coupled to the first cam plate 66, and the first cam plate 66 is coupled to the left side shaft 60 and rotates integrally with the rear wheels WR. The armature plate 82, on the other hand, is engaged with the clutch housing 52, and the clutch housing 52 is linked to the driven gear 15 and corresponds to the rotation of the engine EN. We can see from this that the above-mentioned rotational force F is not generated when the rotation of the driven gear 15 driven by the engine EN is the same as the rotation of the rear wheels WR, but this rotational force F is generated when there is a rotational difference.

Figures 6A, 6B:
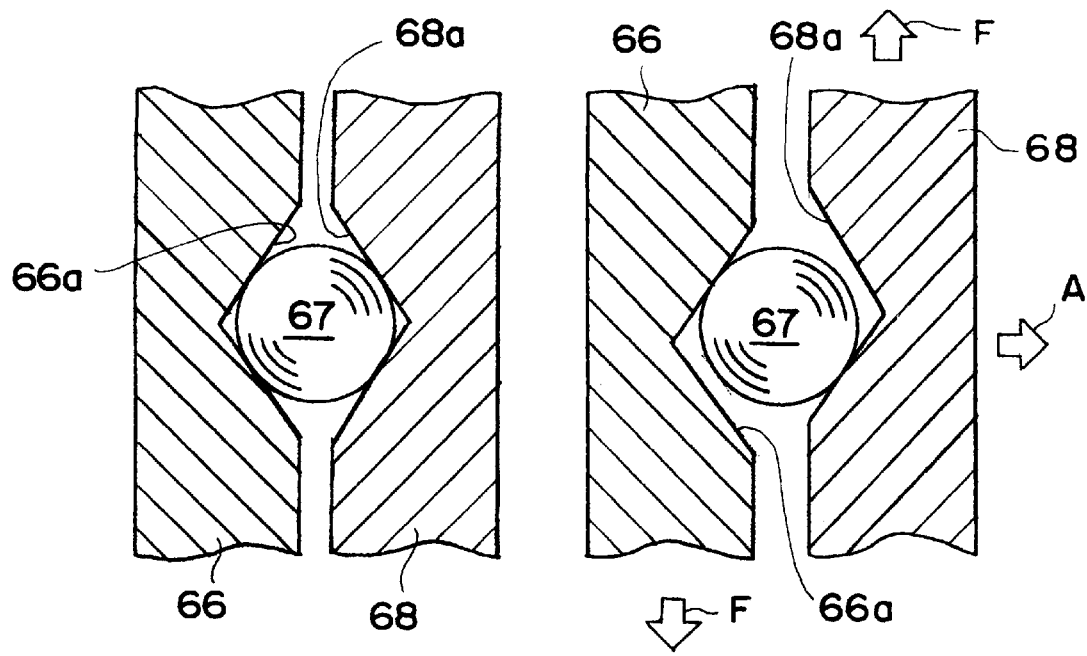
FIGS. 6A and 6B are cross sections illustrating the ball cam mechanism that constitutes the above-mentioned left differential clutch mechanism.

When a rotational difference thus occurs between the rotation of the driven gear 15 driven by the engine EN and the rotation of the rear wheels WR, and the above-mentioned rotational force F is generated, this rotational force F acts as a force that rotates the second cam plate 68 with respect to the first cam plate 66 in the ball cam mechanism 65, as shown in FIG. 6B. Here, cam balls 67 are disposed within cam grooves 66a and 68a, which have tapered surfaces, in between the two cam plates 66 and 68. Accordingly, the above-mentioned rotational force F causes the second cam plate 68 to rotate relative to the first cam plate 66, and the second cam plate 68 moves to the right in the axial direction as indicated by the arrow A in FIG. 6B.

This movement of the second cam plate 68 to the right presses the pressing component 55a of the pressure plate 55 to the right, and the pressure plate 55 presses the separator plates 53 and clutch plates 54 against the clutch housing 52. As a result, the plates 53 and 54 are engaged by their frictional force, and the above-mentioned rotational difference is suppressed. The pressing force exerted on the pressure plate 55 in this case corresponds to the above-mentioned rotational force F, and this rotational force F corresponds to the attractive force of the armature plate 82 resulting from the magnetic force of the armature plate 82.

As can be seen from the above, the clutch engagement force can be freely controlled in the left differential clutch mechanism DRL by controlling the current sent to the solenoid coil 80, allowing control over the clamping of the armature plate 82 while the sliding surface 82a of the armature plate 82 slides with respect to the sliding surface 81a of the coil housing 81. Smooth control is possible here because the lubricating oil is effectively supplied in between the sliding surfaces 81a and 82a from the oil reservoir 77.

Figure 7:
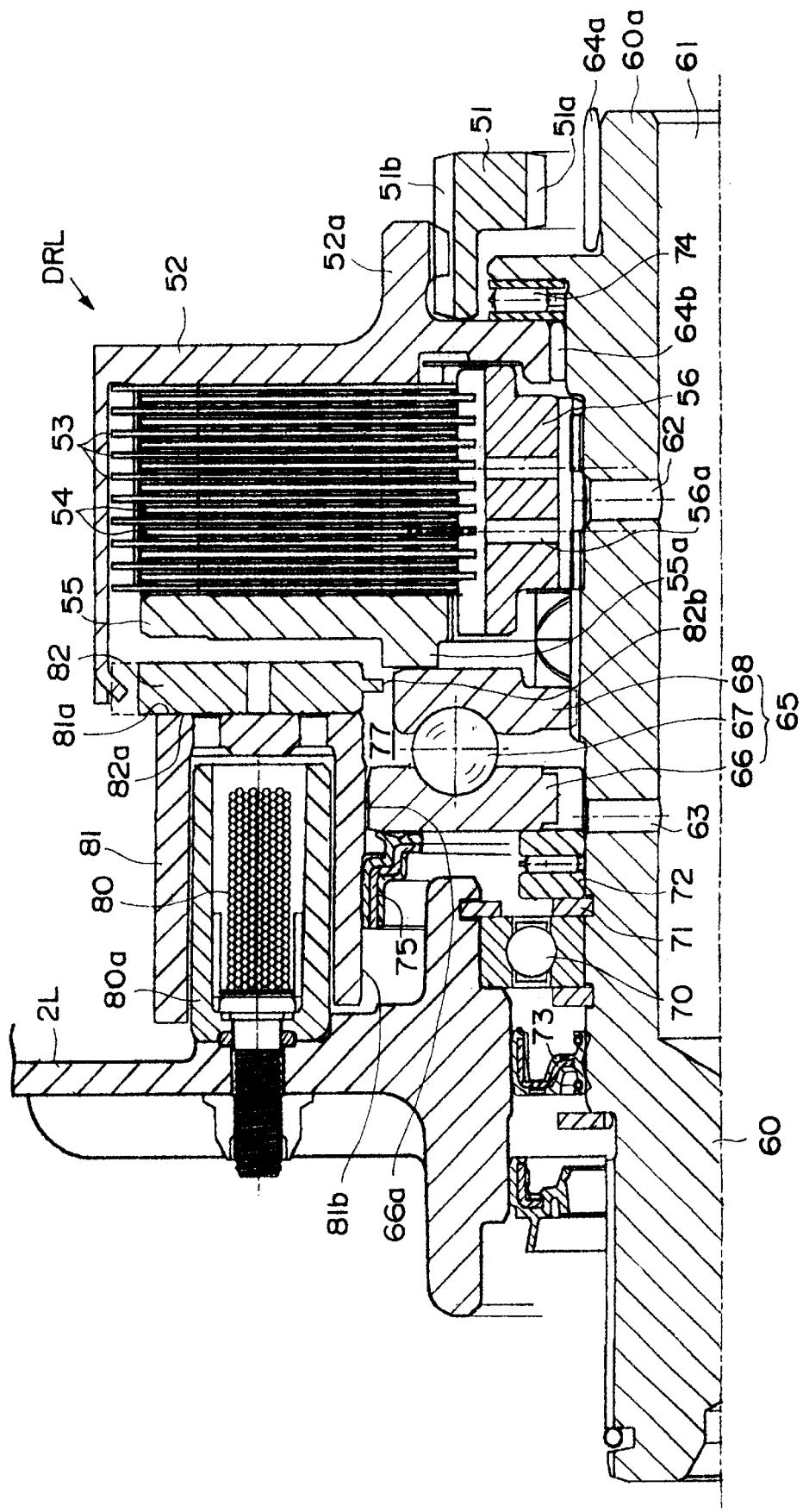
FIG. 7 is a cross section illustrating a variation example of the left differential clutch mechanism in the above-mentioned rear axle device.

A thorough and effective supply of lubricating oil is made possible by forming the oil reservoir 77 in this way, but the formation of the oil reservoir is not limited to the structure described above. For example, the oil reservoir may be formed by having the inner peripheral end of the armature plate 82 protrude downward. However, since a magnetic flux flows through the coil housing 81 and the armature plate 82 and generates an attractive magnetic force when power is sent to the solenoid coil 80, the magnetic flux will be disturbed and the magnetic force weakened if the inner peripheral end of the armature plate 82 is extended inward just as it is. Consequently, as shown in FIG. 7, it is preferable to form the oil reservoir by forming a narrow annular protrusion 82b around the inner peripheral of the armature plate 82.

As described above, the differential clutch mechanisms DRL and DRR control clutch engagement by converting electromagnetic force into a force that presses the clutch plates in the axial direction by means of a ball cam mechanism, but clutch engagement may instead be controlled by causing the electromagnetic force acting on the armature plate to act directly as a clutch engagement force.

Figure 8:
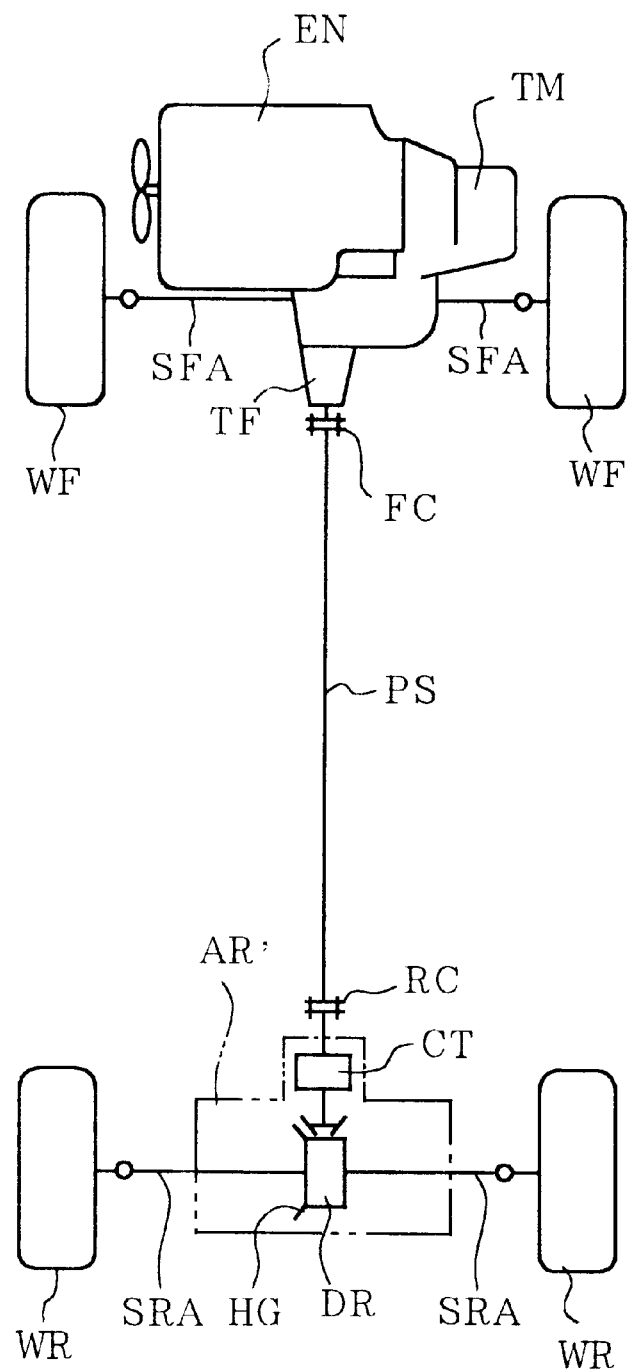
FIG. 8 is a schematic diagram illustrating a power transmission system pertaining to a different example of a four-wheel-drive vehicle, equipped with the electromagnetic clutch pertaining to the present invention.

The left and right differential clutch mechanisms DRL and DRR are disposed on either side of the driven gear 15 of the hypoid gear mechanism HG in the above-mentioned rear axle device AR, but the electromagnetic clutch mechanism pertaining to the present invention may instead be disposed ahead of the hypoid gear mechanism HG, as shown in FIG. 8. Those components in FIG. 8 that are the same as in the power transmission system in FIG. 1 are labeled the same, and will not be described again.

With the power transmission system in FIG. 8, the electromagnetic clutch mechanism is disposed between the rear coupling RC and the hypoid gear mechanism HG, and a 2–4 switching mechanism CT is constituted by this electromagnetic clutch mechanism. As a result, power transmission from the propeller shaft PS to the hypoid gear mechanism HG can be blocked to achieve a two-wheel-drive state, or this power transmission can be enabled to achieve a four-wheel-drive state. The power is split by a rear differential mechanism DR and transmitted from the hypoid gear mechanism HG to the left and right rear wheels WR. This rear differential mechanism DR may be a mechanism commonly used in the past, or the left and right differential clutch mechanisms DRL and DRR discussed above may be used.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. In combination,
an electromagnetic clutch including a solenoid coil, a coil housing disposed surrounding the solenoid coil, an armature plate disposed facing a side of the coil housing, and a clutch mechanism,
wherein current flowing to the solenoid coil is controlled so as to control clamping of the armature plate to the coil housing, and the clamping force acting on the armature plate is used to control engagement of the clutch mechanism, and
a lubricating structure comprising:
a lubricating oil supply channel for supplying lubricating oil from inside in the radial direction into a gap between the coil housing and the armature plate, and
an oil reservoir holding lubricating oil to be supplied into the gap around an inner periphery of a region where the coil housing faces the armature plate; and
an oil fence ring mounted around an inner peripheral surface of the armature plate;
wherein the lubricating oil supplied from the lubricating oil supply channel is held back by the oil fence ring, forming the oil reservoir.

2. The combination according to claim 1, comprising an annular rubber lip located at an inner peripheral end of the oil fence ring.

3. The combination according to claim 1, wherein at least part of an inner peripheral end of the armature plate projects annularly toward the inside, forming an annular projection, and the lubricating oil supplied from the lubricating oil supply channel is held back by this annular projection, forming the oil reservoir.

4. In combination,
an electromagnetic clutch including a solenoid coil, a coil housing disposed surrounding the solenoid coil, an armature plate disposed facing a side of the coil housing, and a clutch mechanism,
comprising a cam mechanism controlled by the current flowing to the solenoid coil so as to control the clamping of the armature plate to the coil housing, and converting the clamping force acting on the armature plate into the engagement force of the clutch mechanism, wherein the clamping force acting on the armature plate is used via the cam mechanism to control the engagement of the clutch mechanism, and
a lubricating structure comprising:
a lubricating oil supply channel for supplying lubricating oil from inside in the radial direction into a gap between the coil housing and the armature plate,
an oil reservoir holding lubricating oil to be supplied into the gap around an inner periphery of a region where the coil housing faces the armature plate, and
an oil fence ring mounted around an inner peripheral surface of the armature plate;

wherein the lubricating oil supplied from the lubricating oil supply channel is held back by the oil fence ring, forming the oil reservoir.

5. The combination according to claim 4, wherein the lubricating oil supply channel is formed through the cam mechanism.

6. The combination according to claim 4, comprising an annular rubber lip at an inner peripheral end of the oil fence ring.

7. The combination according to claim 4, wherein at least part of an inner peripheral end of the armature plate projects annularly toward the inside, forming an annular projection, and the lubricating oil supplied from the lubricating oil supply channel is held back by this annular projection, forming the oil reservoir.

8. The combination according to claim 4, wherein the cam mechanism comprises a first cam plate linked to the coil housing, a second cam plate that is linked to an output-side member of the clutch mechanism and imparts an engagement thrust force to the clutch, and cam balls that are disposed in cam grooves formed in the first and second cam plates and is sandwiched between the first and second cam plates.

9. The combination according to claim 8, wherein the lubricating oil supplied from the lubricating oil supply channel is held back by an oil seal mounted on an inner peripheral surface of the coil housing and having a lip facing the side of the first cam plate, forming the oil reservoir.

* * * * *